US009595061B1

(12) United States Patent
Ryan

(10) Patent No.: US 9,595,061 B1
(45) Date of Patent: Mar. 14, 2017

(54) CLOUD-BASED PLATFORM INTEGRATING POINT OF SALE DEVICES OF DIFFERENT TYPES AND/OR FORMATS

(71) Applicant: Accenture Global Services Limited, Dublin (IE)

(72) Inventor: Jeffrey Stanford Ryan, Phoenix, AZ (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/952,310

(22) Filed: Nov. 25, 2015

Related U.S. Application Data

(60) Provisional application No. 62/196,767, filed on Jul. 24, 2015.

(51) Int. Cl.
  *G06Q 30/06* (2012.01)
  *G06Q 20/20* (2012.01)
  *H04L 29/06* (2006.01)
  *G06F 17/30* (2006.01)

(52) U.S. Cl.
  CPC ... *G06Q 30/0635* (2013.01); *G06F 17/30569* (2013.01); *G06Q 20/20* (2013.01); *G06Q 20/202* (2013.01); *H04L 29/06* (2013.01)

(58) Field of Classification Search
  CPC .... G06Q 20/20; G06F 17/30569; H04L 29/06
  USPC ............... 705/16; 709/246; 707/756
  See application file for complete search history.

(56) References Cited

U.S. PATENT DOCUMENTS

| | | | | |
|---|---|---|---|---|
| 8,650,095 | B1* | 2/2014 | Shimoff ................ | G06Q 30/00 705/15 |
| 8,738,449 | B1* | 5/2014 | Cupps .................... | G06Q 10/08 705/15 |
| 9,105,041 | B2* | 8/2015 | Harman ................. | G06Q 30/06 |
| 2001/0037253 | A1* | 11/2001 | Kensey .................. | G06Q 30/06 705/26.41 |
| 2002/0143655 | A1* | 10/2002 | Elston ................... | G06Q 20/02 705/26.81 |
| 2010/0174614 | A1* | 7/2010 | Wu ........................ | G06Q 20/20 705/21 |
| 2011/0125566 | A1* | 5/2011 | McLaughlin ......... | G06Q 20/20 705/14.23 |
| 2012/0054050 | A1* | 3/2012 | Ziegler ................ | G06Q 20/202 705/21 |

(Continued)

*Primary Examiner* — Ramsey Refai
(74) *Attorney, Agent, or Firm* — Harrity & Harrity, LLP

(57) ABSTRACT

A device may receive information regarding a product order via a web portal. The product order may relate to a take-out or delivery of a food product. The device may identify a store location associated with fulfilling the product order. The device may select a store configuration, from a set of store configurations associated with a set of store locations, for the store location associated with fulfilling the product order based on identifying the store location. The device may perform, based on information associated with the particular type of POS device, one or more data conversions on data identifying the product order to generate a converted product order. The converted product order may be associated with a format compatible with the particular type of POS device. The device may store the converted product order in a queue associated with the store location.

20 Claims, 14 Drawing Sheets

(56) References Cited

U.S. PATENT DOCUMENTS

2014/0257877 A1\* 9/2014 L'Heureux ............ G06Q 30/06
705/5

\* cited by examiner

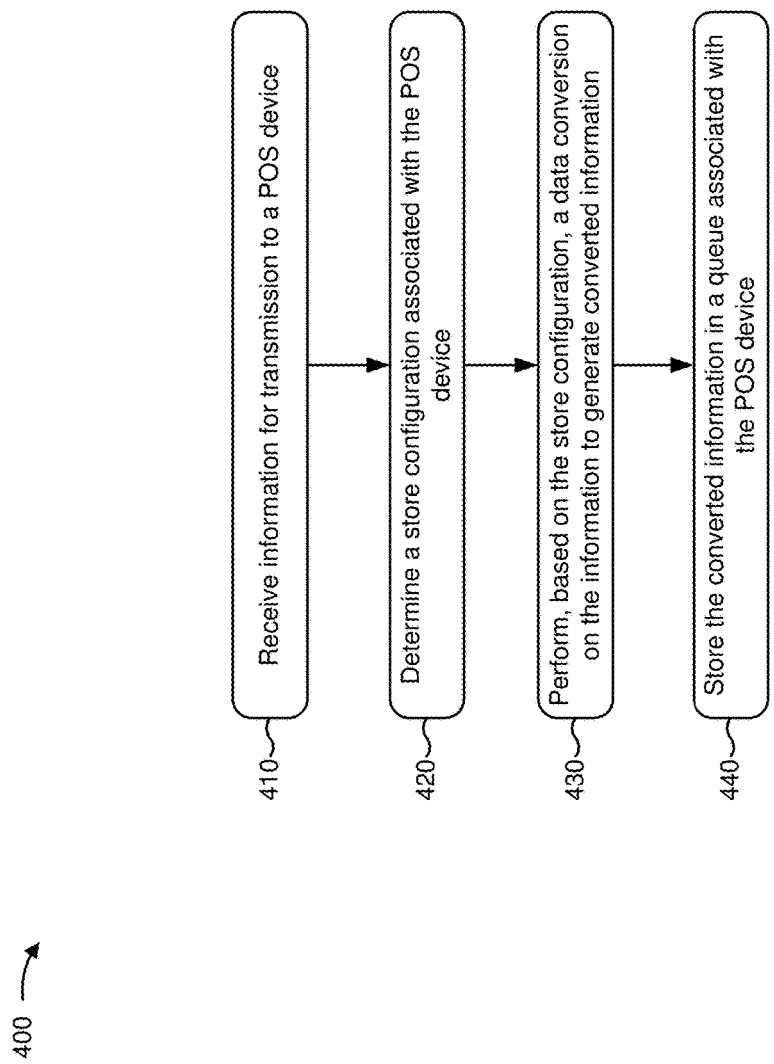

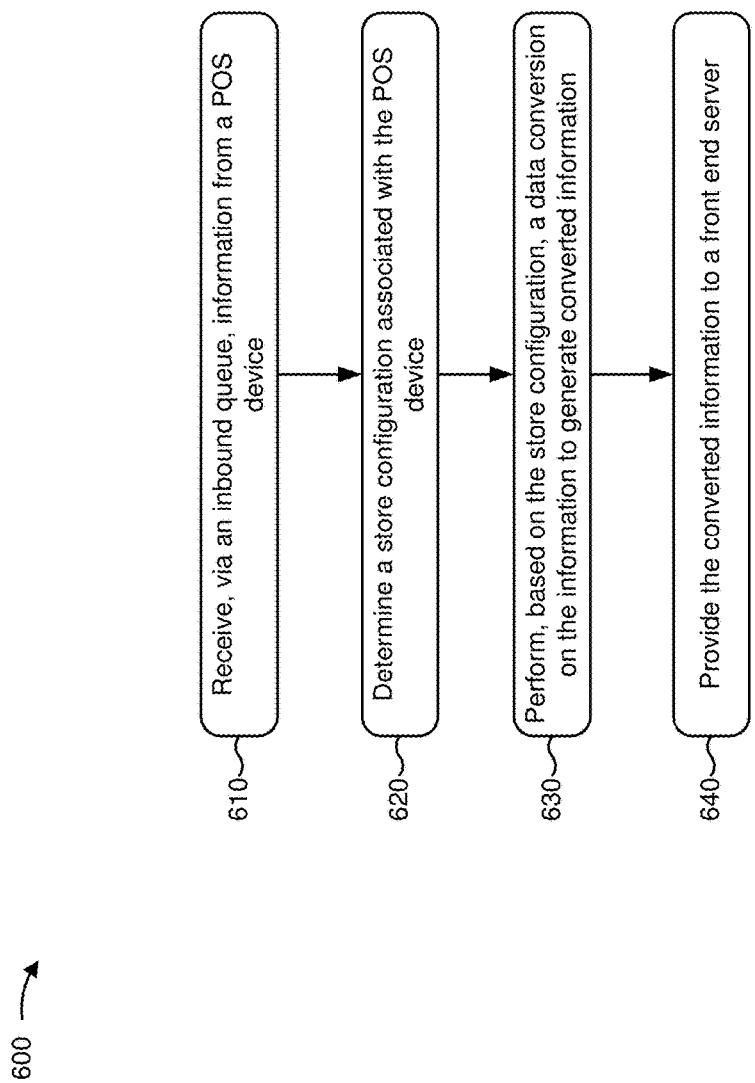

CLOUD-BASED PLATFORM INTEGRATING POINT OF SALE DEVICES OF DIFFERENT TYPES AND/OR FORMATS

RELATED APPLICATION

This application claims priority under 35 U.S.C. §119 to U.S. Provisional Patent Application No. 62/196,767, filed on Jul. 24, 2015, the content of which is incorporated by reference herein in its entirety.

BACKGROUND

A point of sale device may be utilized at a store location for processing a purchase at the store location. For example, a point of sale device may process a credit card transaction as payment for the purchase. Different point of sale devices may utilize different information formats. For example, a first point of sale device produced by a first vendor may utilize a first information format associated with the first vendor and a second point of sale device produced by a second vendor may utilize a second information format associated with the second vendor.

SUMMARY

According to some possible implementations, a device may include one or more processors. The device may receive information regarding a product order via a web portal. The product order may relate to a take-out or delivery of a food product. The product order may be associated with a particular order format associated with the web portal. The device may identify a store location associated with fulfilling the product order. The store location may utilize a particular type of point of sale (POS) device for managing product orders. The device may select a store configuration, from a set of store configurations associated with a set of store locations, for the store location associated with fulfilling the product order based on identifying the store location. The store configuration may specify information associated with the particular type of POS device. The device may perform, based on information associated with the particular type of POS device, one or more data conversions on data identifying the product order to generate a converted product order. The converted product order may be associated with a format compatible with the particular type of POS device. The device may store the converted product order in a queue associated with the store location.

According to some possible implementations, a computer-readable medium may store one or more instructions that, when executed by one or more processors, may cause the one or more processors to receive a message identifying a product order. The product order may be intended for fulfillment by a store location. The store location may be associated with a point of sale (POS) device. The store location may be one of a plurality of store locations associated with two or more types of POS devices that utilize a corresponding two or more different information formats. The one or more instructions, when executed by one or more processors, may cause the one or more processors to determine, for the message, the store location, of the plurality of store locations, for which the message is intended. The one or more instructions, when executed by one or more processors, may cause the one or more processors to determine, for the store location, an information format, of the two or more different information formats, with which the POS device of the store location is compatible. The one or more instructions, when executed by one or more processors, may cause the one or more processors to convert the message to the information format. The one or more instructions, when executed by one or more processors, may cause the one or more processors to store the converted message in a queue associated with the store location.

According to some possible implementations, a method may include receiving, by a device, a product order via a web portal. The product order may relate to a take-out or delivery of a food product. The product order may be associated with a particular order format associated with the web portal. The method may include identifying, by the device, a store location associated with fulfilling the product order. The store location may utilize a particular type of point of sale (POS) device for managing product orders. The method may include selecting, by the device, a store configuration, from a set of store configurations associated with a set of store locations, for the store location associated with fulfilling the product order based on identifying the store location. The store configuration may specify information associated with the particular type of POS device. The method may include converting, by the device, the product order, based on the information associated with the particular type of POS device, to generate a converted product order. The converted product order may be associated with a format compatible with the particular type of POS device. The method may include storing, by the device, the converted product order in a queue associated with the store location.

BRIEF DESCRIPTION OF THE DRAWINGS

FIG. 4 is a flow chart of an example process for providing information to a point of sale device;

FIG. 6 is a flow chart of an example process for routing information received from a point of sale device;

DETAILED DESCRIPTION

The following detailed description of example implementations refers to the accompanying drawings. The same reference numbers in different drawings may identify the same or similar elements.

A point of sale device may manage a transaction with a customer of a store location. For example, at a restaurant, a point of sale device may receive a selection of a set of items of an order and process payment for the order. Similarly, at a retail store, a point of sale device may provide information regarding an inventory, pricing, and/or perform checkout and payment for a customer. Some point of sale devices are associated with a cloud-based platform. For example, in a food delivery context, a customer may select one or more items via the cloud-based platform of the point of sale device, and the point of sale device may add the one or more items to a preparation queue (e.g., for preparation by a line cook). The point of sale device may provide pricing information for the one or more items and may process payment for the one or more items.

However, a set of store locations of the same franchise may utilize multiple types of point of sale devices associated with multiple information formats. Replacing the multiple types of point of sale devices with a single type of point of sale device may be expensive and ill-suited to a multinational franchise with extensive investment in legacy systems. Implementations, described herein, may utilize a real-time integration (RTI) server to integrate multiple types of point of sale devices with multiple information formats into a cloud-based platform. In this way, the RTI server may facilitate improved scalability, improved hardware flexibility, a more streamlined cloud-based platform, improved user experience, and/or reduced cost relative to installing new point of sale devices or utilizing multiple cloud-based platforms. Moreover, by facilitating a single cloud-based platform adapted for multiple point of sale devices, the RTI server may reduce memory storage and/or computing resource requirements relative to utilizing multiple websites by facilitating code reuse, streamlined functionalities, or the like.

Figure 1:
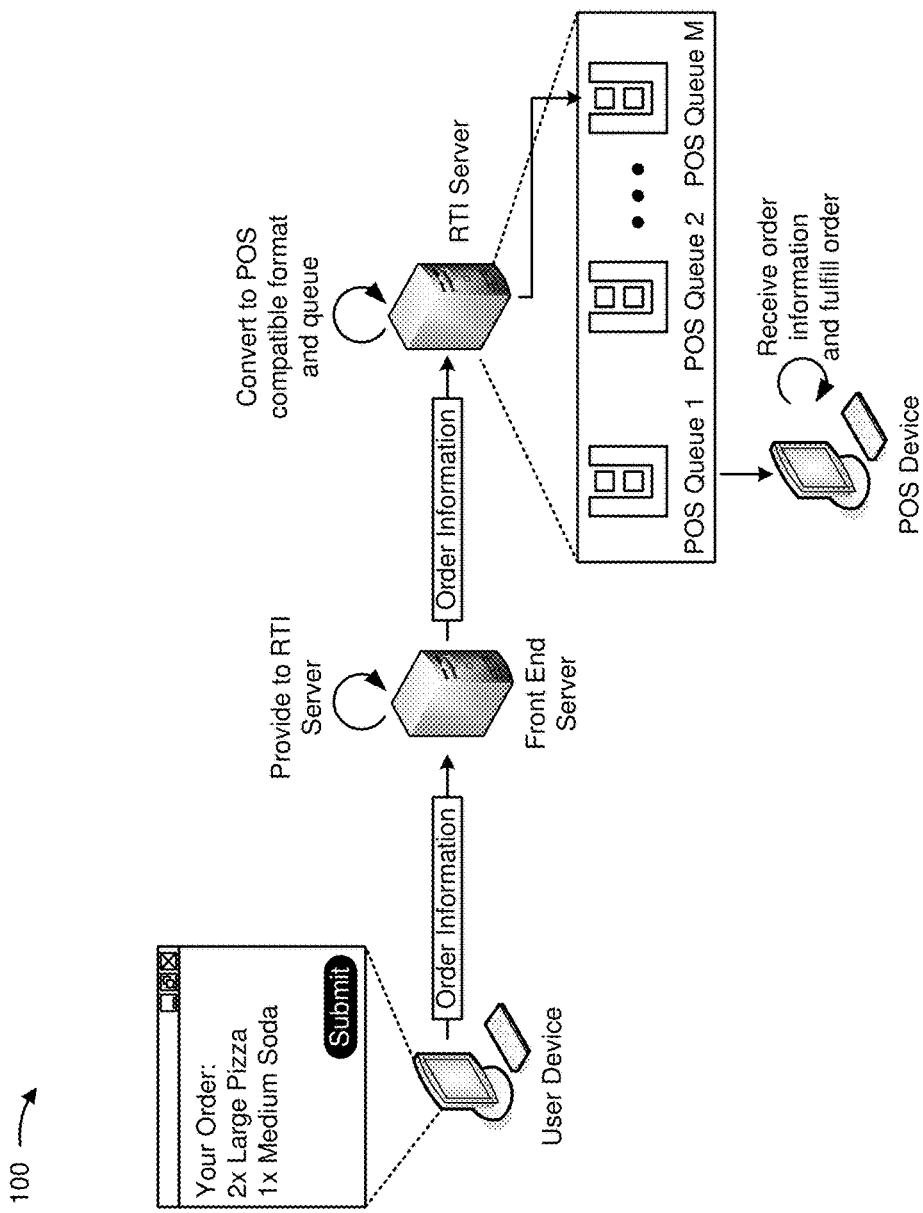
FIG. 1 is a diagram of an overview of an example implementation described herein.

FIG. 1 is a diagram of an overview of an example implementation 100 described herein. As shown in FIG. 1, a cloud-based platform may include multiple systems, such as a front end server supporting a web platform (e.g., a web site for the cloud-based platform) and an RTI server for processing information of the web platform. The front end server may receive, from a user device, order information. The order information may include a product order for takeout or delivery of a food product from a store location that provides a take-out or delivery service. For example, when a user visits a website associated with a franchise (that includes multiple store locations), the user may select a set of items for delivery (e.g., "2× Large Pizza" and "1× Medium Soda") from a particular store location, and the front end server may receive information, in a particular order format, identifying the set of items for delivery. The front end server may provide the order information to the RTI server for processing.

The RTI server may determine the store location assigned to fulfill the product order and may determine a store configuration associated with the store location. The store configuration may identify a type of point of sale (POS) device utilized by the store location, an information format for the POS device, or the like. The RTI server may perform one or more data conversions on the order information to convert the order information into a format compatible with the type of POS device utilized by the store location, and may provide converted order information to a queue associated with the POS device. The queue (e.g., POS Queue 1, POS Queue 2, etc.) may facilitate asynchronous communication with the POS device, thereby permitting the data hub to store one or more messages via the queue for retrieval by the POS device, transmission to the POS device, or the like. The POS device may receive the converted order information from the RTI server via the POS queue, and may process the converted order information to fulfill the order for the user. In another example, the POS device may provide confirmation information to the user device, update information to the user device, or the like via the RTI server and/or the front end server. In another example, the POS device may receive payment information from the user device via the front end server and/or the RTI server.

In this way, a franchise can integrate multiple POS devices associated with multiple information formats into a single cloud-based platform by using n RTI server to perform data conversions of order information and store converted order information via a set of queues dedicated to the set of POS devices.

Figure 2:
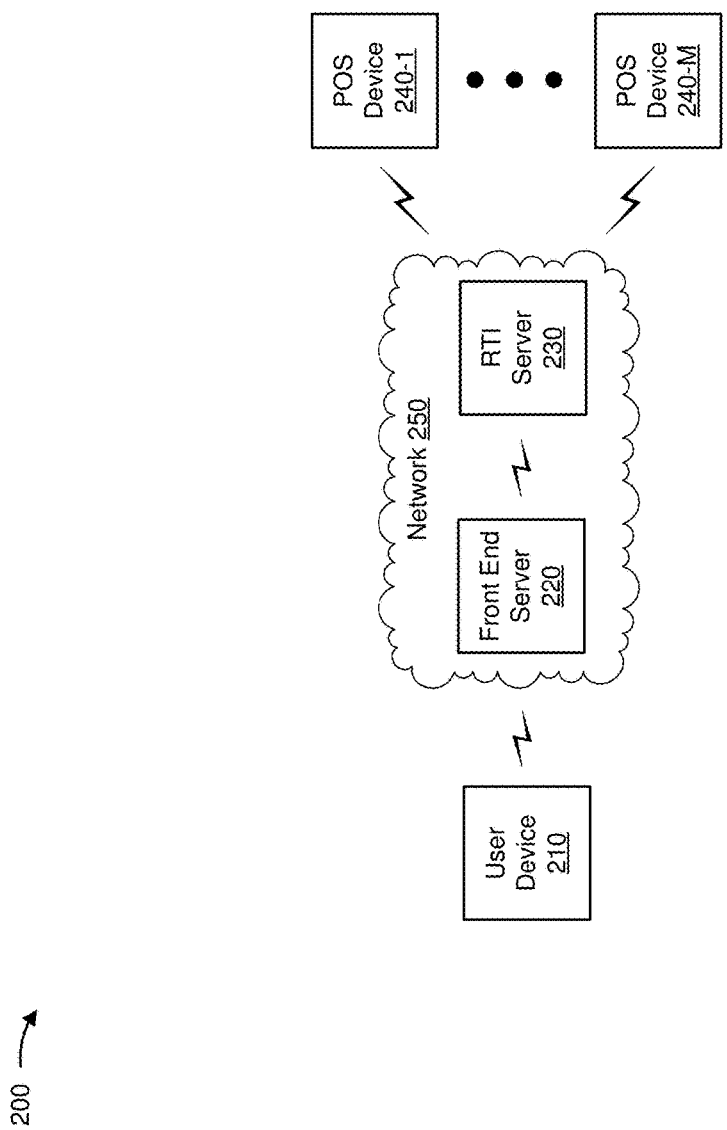
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a front end server 220, an RTI server 230, one or more point of sale (POS) devices 240-1 through 240-M (hereinafter referred to collectively as "POS devices 240," and individually as "POS device 240"), and a network 250. Devices of environment 200 may interconnect via wired connections, wireless connections, or a combination of wired and wireless connections.

User device 210 may include one or more devices capable of receiving, generating, storing, processing, and/or providing information associated with ordering one or more items from a web platform for delivery. For example, user device 210 may include a device, such as a mobile phone (e.g., a smart phone, a radiotelephone, etc.), a computer (e.g., a desktop computer, a laptop computer, a tablet computer, a handheld computer, etc.), a gaming device, a wearable communication device (e.g., a smart wristwatch, a pair of smart eyeglasses, etc.), or a similar type of device. In some implementations, user device 210 may access a web platform associated with a group of store locations and provide order information to a front end server associated with the web platform for routing to a particular POS device 240 (e.g., via RTI server 230) associated with a particular store location of the group of store locations. In some implementations, user device 210 may provide information, received from POS device 240, for display. For example user device 210 may receive an order confirmation, a payment confirmation, an order status, or the like for display to a user. In some implementations, user device 210 may receive information from and/or transmit information to another device in environment 200, such as front end server 220, RTI server 230, and/or POS device 240.

Front end server 220 may include one or more devices capable of storing, processing, and/or routing information. For example, front end server 220 may include a server associated with operating a web platform, such as a website for a group of store locations. In some implementations, front end server 220 may include a virtual machine operating in a cloud environment. In some implementations, front end server 220 may receive, from user device 210, information, such as order information, payment information, or the like. In some implementations, front end server 220 may provide the information to RTI server 230 (e.g., for routing to POS device 240). Additionally, or alternatively, front end server 220 may receive information and provide the information directly to POS device 240 (e.g., without providing the information to RTI server 230). In some implementations, front end server 220 may include a communication interface that allows front end server 220 to receive information from and/or transmit information to other devices in environment 200, such as user device 210, RTI server 230, and/or POS device 240.

RTI server 230 may include one or more devices capable of storing, processing, and/or routing information. For example, RTI server 230 may include a server that is associated with managing information for a cloud-based platform (e.g., a web platform, front end server 220, a group of POS devices 240, or the like). In some implementations, RTI server 230 may include a virtual machine operating in a cloud environment. In some implementations, data hub sever 230 may include one or more queues for receiving and/or providing information. For example, RTI server 230 may include a set of Apache ActiveMQ™ message queues. Additionally, or alternatively, RTI server 230 may include one or more queues associated with routing information from a first module of RTI server 230 to a second module of RTI server 230. For example, RTI server 230 may include a queue associated with receiving information from an ActiveMQ inbound message queue and providing the information to a data conversion module associated with converting the information to a format associated with POS device 240. In some implementations, RTI server 230 may include a communication interface that allows RTI server 230 to receive information from and/or transmit information to other devices in environment 200, such as user device 210, front end server 220, and/or POS device 240.

POS device 240 may include one or more devices capable of receiving, generating, storing, processing, and/or providing information associated with fulfilling an order. For example, POS device 240 may include a computer (e.g., a desktop computer, a laptop computer, a tablet computer), a smartphone, an electronic cash register, a point-of-sale terminal, or the like. In some implementations, POS device 240 may be associated with a particular information format, such as a SUS/FMS POS format, a Panda software POS format, or the like. In some implementations, POS device 240 may be associated with a queue agent. For example, POS device 240 may utilize a queue agent to obtain information, such as order information from a queue of RTI server 230, by querying the queue periodically (e.g., at a particular time, after a threshold period of time elapses, or the like). In some implementations, a group of POS devices 240 may be associated with a POS data center. The POS data center may include a device associated with a set of POS devices 240, the set being a subset of the group of POS devices 240 associated with RTI server 230, and that routes messages from RTI server 230 to a particular POS device 240 of the set of POS devices 240. In some implementations, POS device 240 may include a communication interface that allows POS device 240 to receive information from and/or transmit information to other devices in environment 200, such as user device 210, front end server 220, and/or RTI server 230.

Network 250 may include one or more wired and/or wireless networks. For example, network 250 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, an enterprise network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, although front end server 220 and RTI server 230 are shown as separate devices, front end server 220 and RTI server 230 may be integrated into a single device. Additionally, or alternatively, a set of devices (e.g., one or more devices) of environment 200 may perform one or more functions described as being performed by another set of devices of environment 200.

Figure 3:
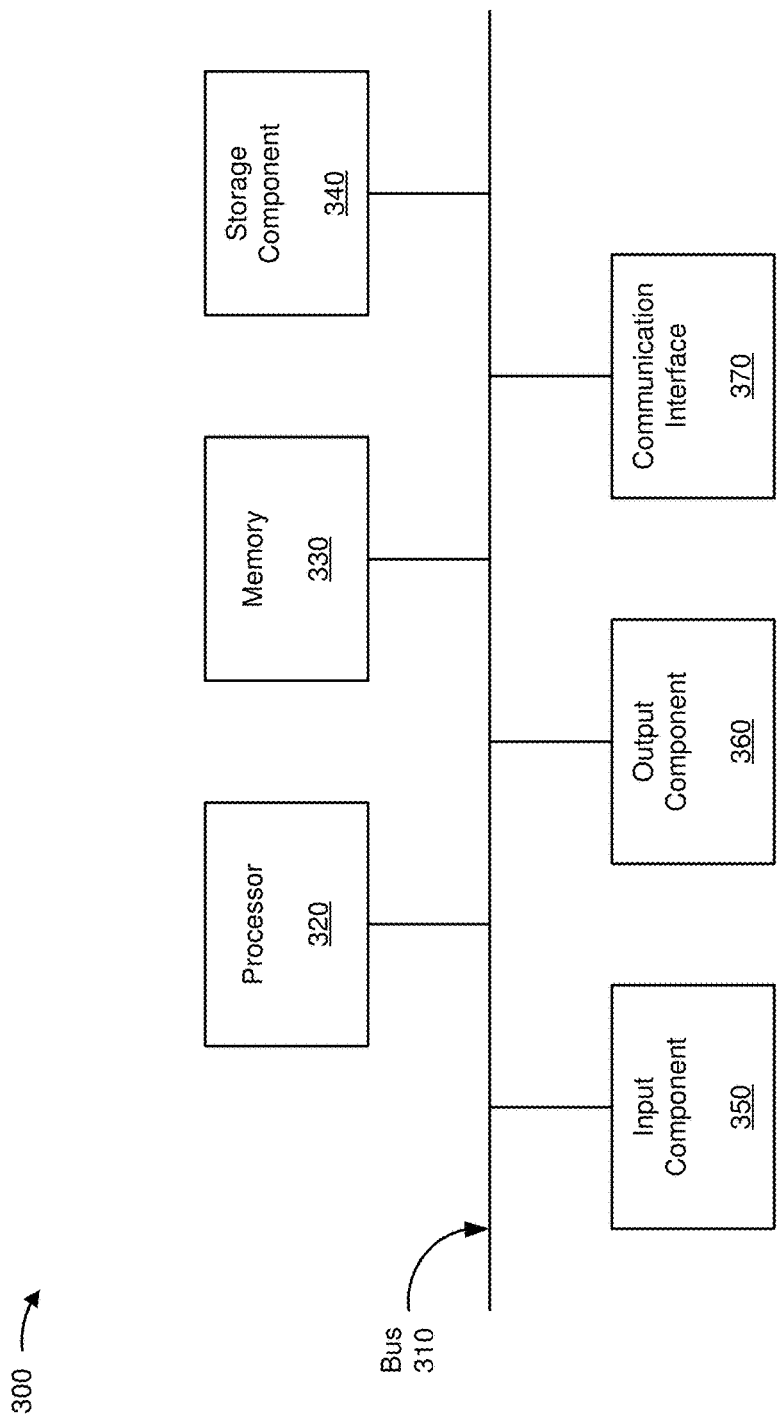
FIG. 3 is a diagram of example components of one or more devices of FIG. 2.

FIG. 3 is a diagram of example components of a device 300. Device 300 may correspond to user device 210, front end server 220, RTI server 230, and/or POS device 240. In some implementations, user device 210, front end server 220, RTI server 230, and/or POS device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include random access memory (RAM), a read only memory (ROM), and/or another type of dynamic or static storage device (e.g., a flash memory, a magnetic memory, an optical memory, etc.) that stores information and or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for providing information to a point of sale device. In some implementations, one or more process blocks of FIG. 4 may be performed by RTI server 230. Additionally, or alternatively, one or more process blocks of FIG. 4 may be performed by another device or a group of devices separate from or including RTI server 230, such as user device 210, front end server 220, and/or POS device 240.

Figure 5A:
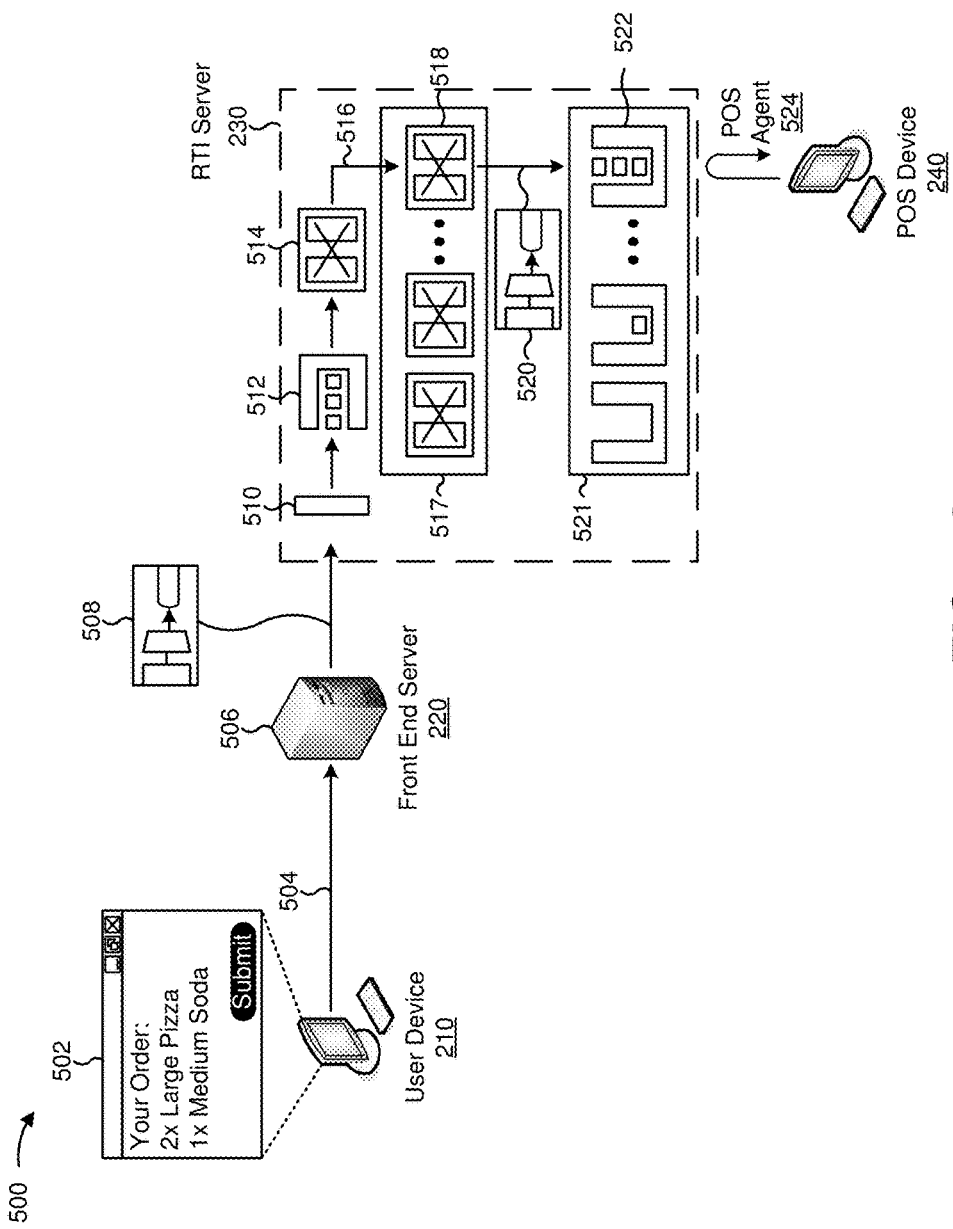
FIGS. 5A-5C are diagrams of an example implementation relating to the example process shown in FIG. 4.
Figure 5B:
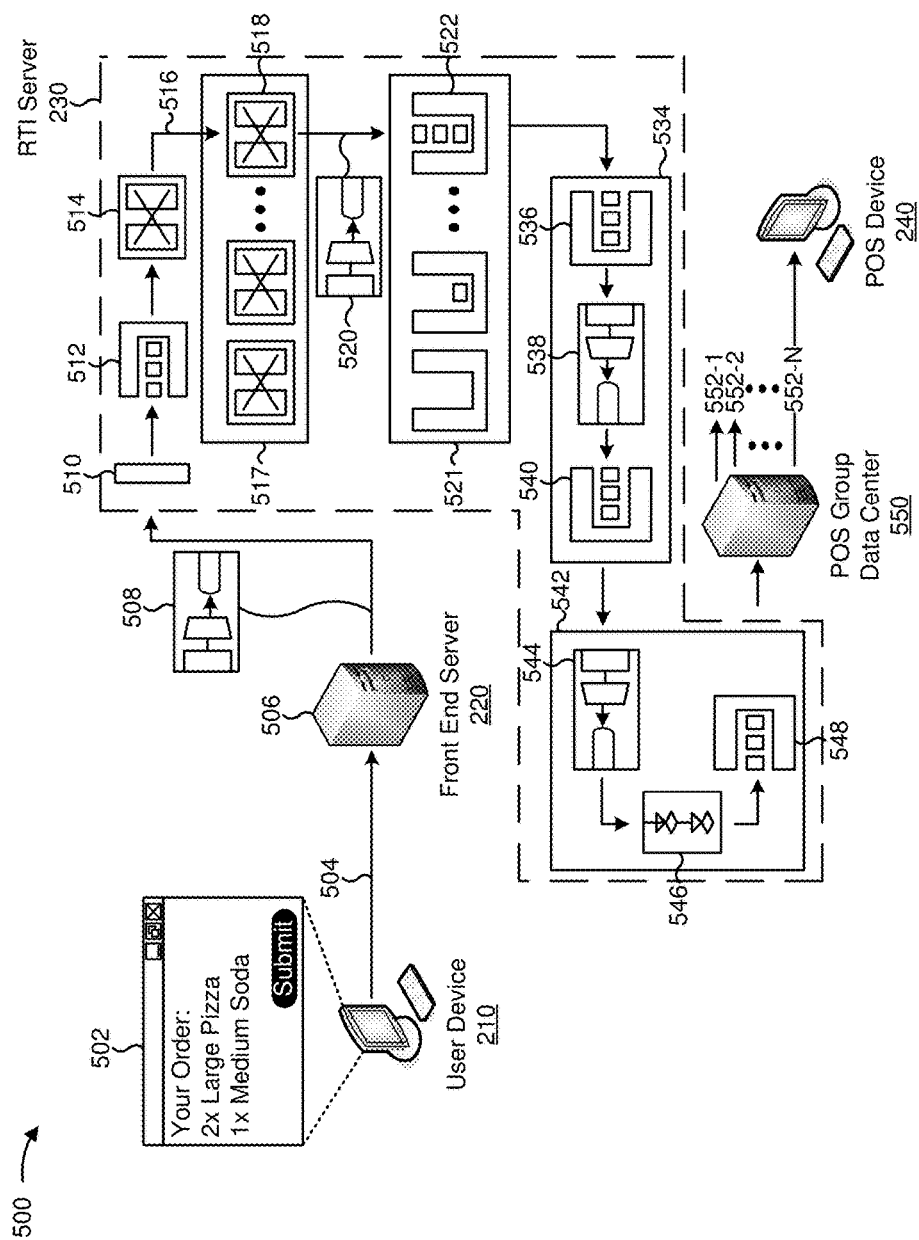
Figure 5C:
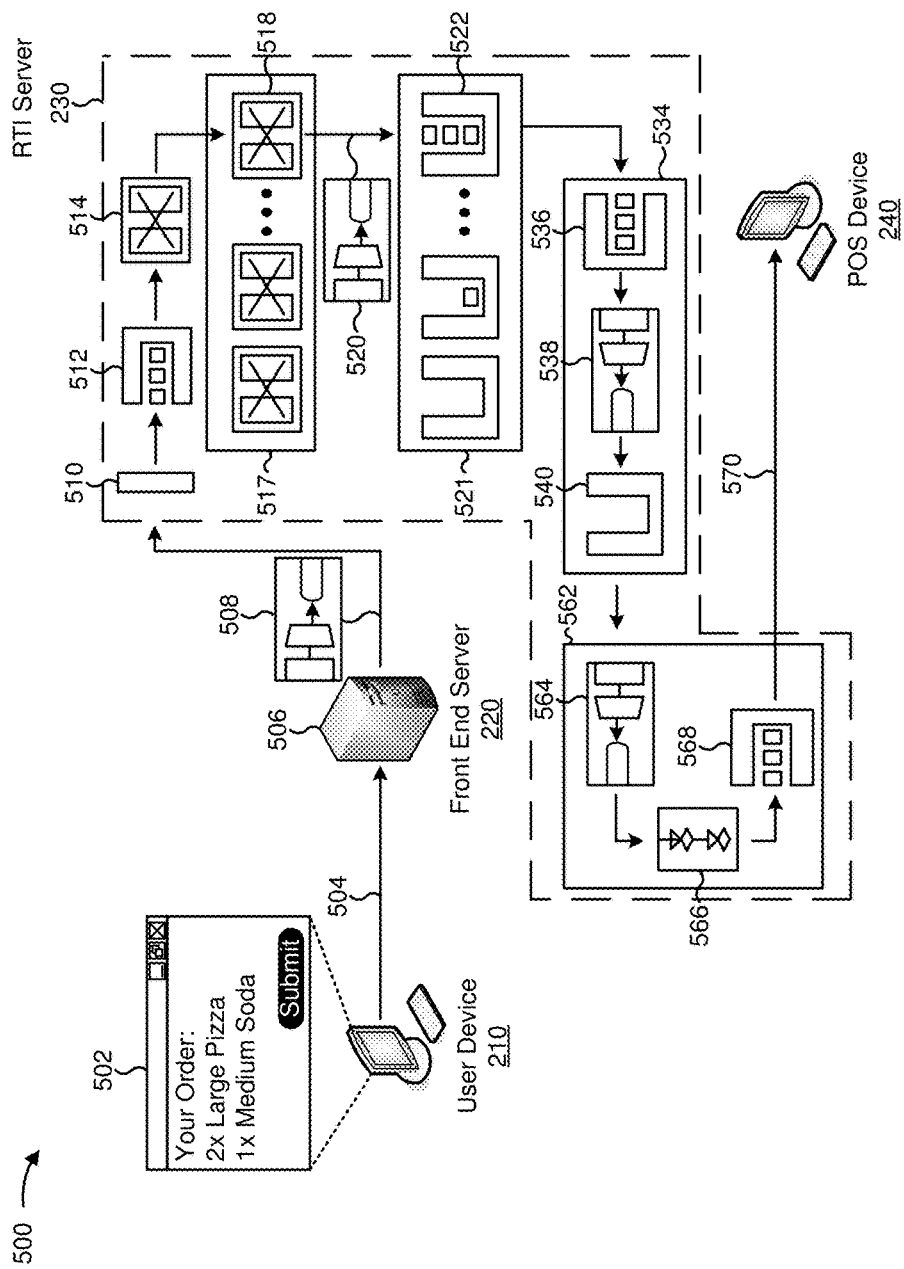

FIGS. 5A-5C are diagrams of an example implementation 500 relating to example process 400 shown in FIG. 4. FIGS. 5A-5C show an example of providing information to a POS device.

As shown in FIG. 4, process 400 may include receiving information for transmission to a POS device (block 410). For example, RTI server 230 may receive order information for transmission to POS device 240. In some implementations, RTI server 230 may receive the order information from front end server 220 via an application programming interface (API) layer associated with RTI server 230 (e.g., a Hybris data hub). For example, as shown in FIGS. 5A-5C, and by reference number 502, a user of user device 210 may select a set of items (e.g., "2× Large Pizza" and "1× Medium Soda") for delivery from a store location associated with POS device 240. As shown by reference number 504, user device 210 may provide order information to front end server 220. In some implementations, the order information may include information identifying the set of items, information identifying the store location, information identifying the user, or the like.

As shown by reference numbers 506 and 508, front end server 220 (e.g., a Hybris core device) may receive the order information and utilize a Hybris data hub adapter 508 to wrap the order information into an object type receivable by RTI server 230 (e.g., a Hybris data hub device). For example, front end server 220 may utilize Hybris data hub adapter application programming interface (API) code to wrap the order information into a data transfer object (DTO object) and may utilize the Hybris data hub adapter 508 to convert information of the DTO object to a comma separated value (CSV) format of information. As shown by reference number 510, RTI server 230 may receive the CSV information via a CSV web service module 510 of RTI server 230.

As further shown in FIG. 4, process 400 may include determining a store configuration associated with the POS device (block 420). For example, RTI server 230 may determine the store configuration associated with POS device 240. The store configuration may include information identifying a type of POS device 240, an information format for information provided to POS device 240, a message transmission method type (e.g., information regarding how messages are removed from a POS queue, such as by a POS agent, by a push transmission, etc.), or the like. For example, as shown in FIGS. 5A-5C, and by reference number 512, based on receiving the CSV information, RTI server 230 may cause the CSV information to be associated with an inbound feed channel 512. As shown by reference number 514, RTI server 230 may remove the CSV information from inbound message feed channel 512 and perform data transformation 514 to convert the CSV information from a raw format associated with front end server 220 to a canonical format associated with RTI server 230.

In some implementations, RTI server 230 may obtain the store configuration information from a data structure associated with RTI server 230. For example, RTI server 230 may process the order information to identify a store location that is intended to fulfill the order. In this case, RTI server 230 may determine a type of POS device 240 utilized by the store location and an information format associated with that type of POS device 240. Additionally, or alternatively, RTI server 230 may obtain store configuration information from another device, such as from a store configuration data structure, from front end server 220, or the like.

As further shown in FIG. 4, process 400 may include performing, based on the store configuration, a data conversion on the information to generate converted information (block 430). For example, RTI server 230 may perform the data conversion to generate the converted information. In some implementations, RTI server 230 may alter the information when generating the converted information. For example, RTI server 230 may split the order information into multiple portions of order information. Additionally, or alternatively, RTI server 230 may add information to the converted information, such as adding authentication information, user identification information (e.g., obtained from a user information data structure), user preference information, or the like.

For example, as shown in FIGS. 5A-5C, and by reference number 516, RTI server 230 may route the order information (e.g., that has been converted to the canonical format) to a set of data conversion modules 517. RTI server 230 may select, from the set of data conversion modules 517, a particular data conversion module 518 associated with converting information to an information format associated with a type of POS device 240 utilized at the store location to which the order information is intended to be provided. Data conversion module 518 may perform a data conversion of a portion of the order information to generate converted information associated with the information format for POS device 240. In this way, RTI server 230 may integrate multiple types of POS devices 240 associated with multiple information formats into a cloud-based platform.

As further shown in FIG. 4, process 400 may include storing the converted information in a queue associated with the POS device (block 440). For example, RTI server 230 may store the converted information (e.g., converted order information) in the queue associated with POS device 240. In some implementations, RTI server 230 may dynamically generate queues. For example, RTI server 230 may determine that a queue is not instantiated for POS device 240 and may generate the queue for providing information to POS device 240. Additionally, or alternatively, RTI server 230 may remove a queue, such as when the queue does not include any messages for POS device 240. In this way, RTI server 230 may facilitate addition of a store location, removal of a store location, a replacement of a particular POS device 240 at a store location with another type of POS device 240, or the like.

In some implementations, RTI server 230 may store the converted information in a queue associated with a particular POS device 240. For example, RTI server 230 may store first converted information in a first queue dedicated for a first POS device 240 and store second converted information in a second queue dedicated for a second POS device 240. Additionally, or alternatively, RTI server 230 may store converted information in a queue associated with a group of POS devices 240. For example, the queue may be associated with a group of POS devices 240 associated with a similar format, a common organizational entity, a common owner, or the like. In this case, RTI server 230 may include information indicating for which POS device 240, of the group of POS devices 240, the converted information is intended. In this way, RTI server 230 may integrate a legacy system that links a group of POS devices 240.

As shown in FIGS. 5A-5C, and by reference number 520, a Java message service (JMS) data hub adapter of RTI server 230 may select, from a set of queues 521, a particular queue 522 (e.g., an ActiveMQ queue) as an endpoint for storing the converted information from data conversion 518.

In some implementations, the converted information may be obtained from the particular queue 522 by POS device 240 using a message queue agent (e.g., operating on POS device 240). For example, as shown in FIG. 5A, and by reference number 524, a POS agent 524 may obtain the converted information from queue 522 for POS device 240. In this case, RTI server 230 may provide information to POS device 240 indicating a network address for the particular queue 522, such as an Internet protocol (IP) address, a port address, or the like, that POS device 240 may utilize to obtain the converted information. In this way, RTI server 230 may facilitate asynchronous communication with a POS device 240 that includes a message queue agent module, such as POS agent 524.

In some implementations, the converted information may be transmitted from the particular queue 522 to POS device 240 via transmission control protocol (TCP), hypertext transfer protocol secure (HTTPS), java message service (JMS), or another type of protocol. For example, as shown in FIG. 5B, and by reference number 534, a data hub subscriber extension 534 may obtain the converted information from POS queue 532. Data hub subscriber extension 534 may include data hub subscriber extension channel 536, a JMS inbound adapter 538, and JMS in channel queue 540. Collectively, data hub subscriber extension 534 may facilitate transmission of the converted information to POS device 240. Data hub subscriber extension channel 536 may receive the converted information from POS queue 532. JMS inbound adapter 538 may determine a desired endpoint for the converted information (e.g., a TCP related endpoint, an HTTPS related endpoint, or the like). JMS in channel queue 540 may direct the converted information to the desired endpoint.

The converted information may be routed from data hub subscriber extension 534 to TCP module 542, which may include TCP adapter 544, TCP service activator 546, and TCP in channel queue 548. TCP module 542 may be associated with facilitating transmission of the converted information to POS group data center 550. TCP adapter 544 may facilitate causing the message to be transmitted via TCP. TCP service activator 546 may be associated with activating TCP transmission service for the converted information. TCP in channel queue 548 may be associated with providing the converted information via TCP. POS group data center 550 may receive the converted information from the particular queue 522 (e.g., via data hub subscriber extension 534 and TCP module 542) via a TCP connection and may provide the converted information to POS device 240 via a transmission 552, of a set of transmissions 552 that POS group data center 550 provides to a set of POS devices 240.

In some implementations, the converted information may be transmitted from the particular queue 522 to POS device 240 via Hypertext Transfer Protocol (HTTP) or HTTP Secure (HTTPS). For example, as shown in FIG. 5C, and by reference number 562, the converted information may be provided from data hub subscriber extension 534 to HTTPS module 562, which may include HTTPS adapter 564, HTTPS service activator 566, and HTTPS in channel queue 568. HTTPS module 562 may be associated with facilitating transmission of the converted information to POS device 240 via an HTTPS connection. HTTPS adapter 564 may be associated with adapting the converted information for transmission via HTTPS. HTTPS service activator 566 may be associated with causing HTTPS transmission to be activated. HTTPS in channel queue 568 may be associated with providing the converted information via HTTPS. As shown by reference number 570, RTI server 230 may provide the converted information from HTTPS module 562 to POS device 240 via an HTTPS connection.

In this way, RTI server 230 may integrate multiple types of POS devices 240 associated with multiple information formats into a cloud-based platform using a set of data conversion modules and information regarding a store configuration.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As indicated above, FIGS. 5A-5C are provided merely as an example. Other examples are possible and may differ from what was described with regard to FIGS. 5A-5C.

FIG. 6 is a flow chart of an example process 600 for routing information received from a point of sale device. In some implementations, one or more process blocks of FIG. 6 may be performed by RTI server 230. Additionally, or alternatively, one or more process blocks of FIG. 6 may be performed by another device or a group of devices separate from or including RTI server 230, such as user device 210, front end server 220, and/or POS device 240.

Figure 7:
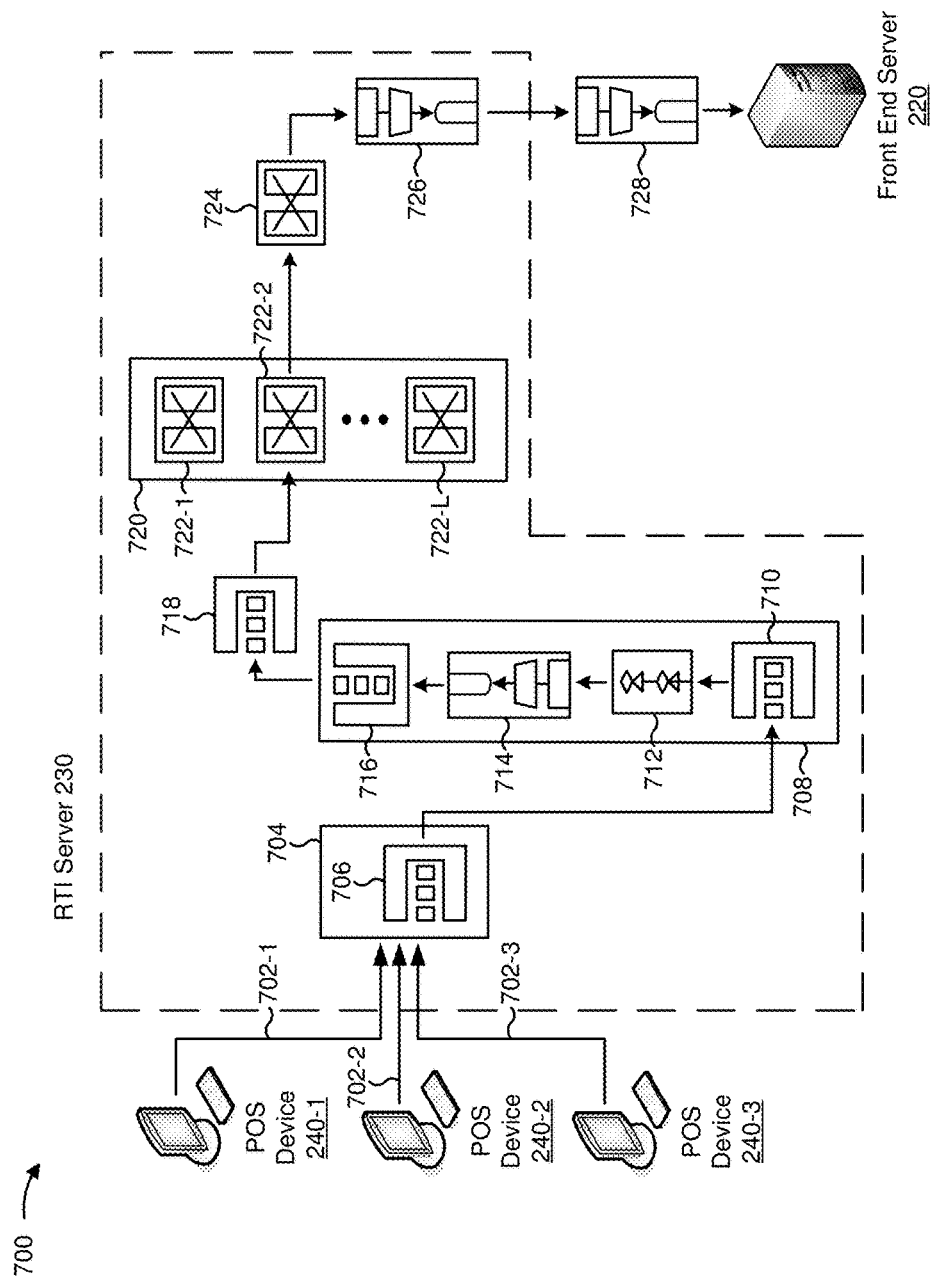
FIG. 7 is a diagram of an example implementation relating to the example process shown in FIG. 6.

FIG. 7 is a diagram of an example implementation 700 relating to example process 600 shown in FIG. 6. FIG. 7 shows an example of routing information received from a POS device.

As shown in FIG. 6, process 600 may include receiving, via an inbound queue, information from a POS device (block 610). For example, RTI server 230 may receive information from POS device 240 that is intended for front end server 220, user device 210, or the like. In some implementations, RTI server 230 may receive the information from POS device 240 via the inbound queue (e.g., an ActiveMQ queue). For example, RTI server 230 may establish a single inbound queue for receiving messages from POS devices 240. In this case, RTI server 230 may provide information identifying the single inbound queue (e.g., network address information, such as an IP address, a port address, or the like) to each POS device 240 that is associated with RTI server 230. Additionally, or alternatively, RTI server 230 may receive the information from POS device 240 via a server device. For example, when a set of other POS devices 240 are associated with a server device, a particular POS device 240 may provide the information to the server device which may route the information to the inbound queue of RTI server 230.

Additionally, or alternatively, RTI server 230 may establish multiple inbound queues, from one of which RTI server 230 may receive the information from POS device 240. For example, RTI server 230 may establish an inbound queue for each POS device 240; an inbound queue for two or more POS devices 240 of a set of POS devices 240 associated with RTI server 230; or the like. In this case, RTI server 230 may provide information associated with a particular queue to one or more POS devices 240 from which the inbound queue is intended to receive information. In some implementations, RTI server 230 may establish multiple inbound queues for receiving information via multiple transmission techniques. For example, RTI server 230 may establish a first inbound queue for receiving information via a TCP technique, a second inbound queue for receiving information via an HTTPS technique, a third inbound queue for receiving information via a Java Message Service (JMS) technique, or the like.

For example, as shown in FIG. 7, and by reference numbers 702-1, 702-2, and 702-3, a set of POS devices 240-1, 240-2, and 240-3 each provide information to an ActiveMQ web service module 704, of RTI server 230, which publishes the information to a single inbound queue 706. In some implementations, ActiveMQ web service module 704 may provide a response message to POS devices 240-1, 240-2, and/or 240-3 acknowledging receipt of information therefrom. As shown by reference number 708, RTI server 230 includes a Spring Integration module 708, which obtains a message (e.g., information from POS device 240-1) from inbound message queue 706 and assigns the message to Spring Integration channel 710 for utilization by RTI server 230.

As further shown in FIG. 6, process 600 may include determining a store configuration associated with the POS device (block 620). For example, RTI server 230 may determine the store configuration associated with POS device 240. In some implementations, RTI server 230 determines the store configuration by parsing the information received from POS device 240. For example, RTI server 230 may interpret the information to determine a format in which the information is provided. Additionally, or alternatively, RTI server 230 may determine identification information, included in the information received from POS device 240, that identifies a store location of POS device 240, a format utilized by POS device 240, or the like. In some implementations, RTI server 230 may query a store configuration data structure to obtain the store configuration associated with POS device 240. For example, RTI server 230 may determine the store configuration associated with POS device 240 and identify a data conversion, based on the store configuration, for utilizing the information received from POS device 240.

For example, as shown in FIG. 7, and by reference number 712, RTI server 230 utilizes a service activator 712 of Spring Integration module 708 to determine a store configuration associated with POS device 240-1 by processing the information received from POS device 240-1. As shown by reference number 714, RTI server 230 utilizes Spring Integration JMS adapter 714 to provide the information to JMS inbound channel 716. As shown by reference number 718, RTI server 230 provides the information from JMS inbound channel 716 to RTI server channel 718. The information may remain associated with RTI server channel 718 until RTI server 230 selects, from a set of data conversion modules 720, a particular data conversion module 722 (e.g., data conversion module 722-2) for performing a data conversion on the information.

As further shown in FIG. 6, process 600 may include performing, based on the store configuration, a data conversion on the information to generate converted information (block 630). For example, RTI server 230 performs the data conversion on the information to generate converted information in a format that can be provided to and read by front end server 220 and/or another device. For example, as shown in FIG. 7, and by reference numbers 720, 722-2, and 724, RTI server 230 utilizes data conversion module 722-2 to convert the information from a format utilized by POS device 240 to a raw format of RTI server 230 and utilizes data conversion module 724 to convert the information from the raw format to converted information in a canonical format associated with front end server 220.

As further shown in FIG. 6, process 600 may include providing the converted information to a front end server (block 640). For example, RTI server 230 may provide the converted information to front end server 220 (which may provide the information to user device 210). For example, as shown in FIG. 7, and by reference number 726, RTI server 230 may utilize a routing extension 726 (e.g., associated with providing messages via ImpEx) to provide the converted information to front end server 220 (e.g., a Hybris front end server). As shown by reference number 728, an ImpEx extension of front end server 220 (or another type of extension) may receive the converted information and provide the converted information for utilization by front end server 220.

In this way, RTI server 230 may facilitate communication between a set of POS devices 240 utilizing multiple information formats and front end server 220 and/or user device 210.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As indicated above, FIG. 7 is provided merely as an example. Other examples are possible and may differ from what was described with regard to FIG. 7.

Figure 8:
FIG. 8 is a flow chart of an example process for updating a front end server.

FIG. 8 is a flow chart of an example process 800 for updating a front end server. In some implementations, one or more process blocks of FIG. 8 may be performed by RTI server 230. Additionally, or alternatively, one or more process blocks of FIG. 8 may be performed by another device or a group of devices separate from or including RTI server 230, such as user device 210, front end server 220, and/or POS device 240.

Figure 9:
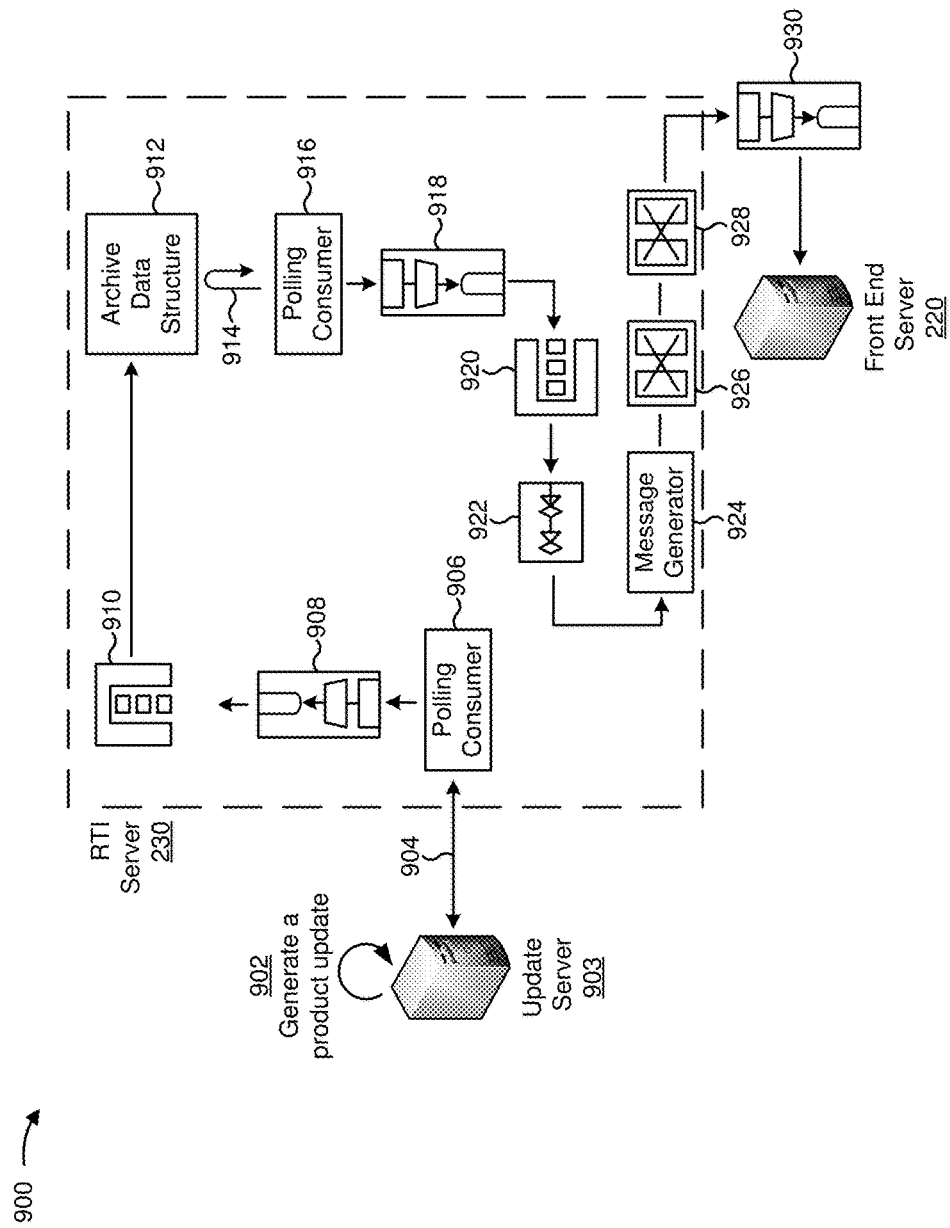
FIG. 9 is a diagram of an example implementation relating to the example process shown in FIG. 8.

FIG. 9 is a diagram of an example implementation 900 relating to example process 800 shown in FIG. 8. FIG. 9 shows an example of updating a front end server.

As shown in FIG. 8, process 800 may include obtaining update information for a front end server (block 810). For example, RTI server 230 may obtain the update information for front end server 220 from an update server (e.g., a server associated with providing update information). Update information may refer to an updated price for an item, an updated offer relating to an item, an updated feature of a web platform, an updated description on the web platform, an updated set of items available at one or more store locations, information regarding a new store location, information regarding an existing store location, or the like. In some implementations, a module of front end server 220 may obtain the update information for utilization by front end server 220. For example, the module of front end server 220 may obtain the update information from the update server.

For example, as shown in FIG. 9 and by reference number 902, an update server 903 generates a product update for a product being offered for sale via a web platform of front end server 220 (e.g., an item of food being offered for delivery by a store location associated with front end server 220). Assume that the product update is intended for display via a web platform associated with front end server 220. As shown by reference number 904, a polling consumer module 906, of RTI server 230, obtains the product update from update server 903. In some implementations, polling consumer module 906 may pull the product update from update server 903. For example, polling consumer module 906 may query update server 903 for the product update based on a particular polling frequency (e.g., at a particular time, after a threshold quantity of time elapses, etc.), which may be configured via a Spring Application module. In some implementations, update server 903 may push the product update to polling consumer module 906 when the product update is generated.

As further shown in FIG. 9, and by reference number 908, the update information is processed by an adapter 908 (e.g., a secure FTP adapter associated with Spring Integration) and provided to channel 910. As shown by reference number 912, the update information is obtained from channel 910 and stored via an archive data structure 912. In this way, RTI server 230 may store the update information, thereby accounting for an error in providing the update information to front end server 220 and facilitating re-transmission of the update information after a failed transmission. As shown by reference number 914, RTI server 230 utilizes polling consumer module 916 to obtain the update information from archive data structure 912 and to provide the update information to file adapter 918 (e.g., a Spring Integration file adapter). RTI server 230 provides the update information from file adapter 918 to channel 920 and, as shown by reference number 922, RTI server 230 converts the update information into a message object using service activator 922 and message generator 924. The message object may include the update information, header information, or the like.

As further shown in FIG. 8, process 800 may include performing a data conversion on the update information to generate converted update information (block 820). For example, RTI server 230 may perform the data conversion on the update information to generate converted update information. For example, as shown in FIG. 9, and by reference numbers 926 and 928, RTI server 230 may utilize data conversion module 926 to convert the update information of the message object to a raw format associated with RTI server 230 (e.g., from a format associated with update server 903) and from the raw format to a canonical format associated with front end server 220. In this way, RTI server 230 reuses a data conversion module associated with converting between the raw format and the canonical format in multiple contexts (e.g., in a first context of a message from front end server 220 to POS device 240, in a second context of a message from POS device 240 to front end server 220, in a third context of a message from update server 903 to front end server 220, or the like). In some implementations, when the message object is intended for another device than front end server 220, RTI server 230 may convert the update information of the message object from the raw format to another format, such as a format associated with POS device 240.

As further shown in FIG. 8, process 800 may include providing the converted update information to the front end server (block 830). For example, RTI server 230 may provide the converted update information to front end server 220 (e.g., for utilization in updating a web platform). For example, as shown in FIG. 9, and by reference number 930, RTI server 230 may provide the message object with converted update information to an adapter module 930 of front end server 220, which may adapt the message object for utilization by front end server 220. In some implementations, RTI server 230 and/or front end sever 220 may include one or more error handling techniques, such as one or more techniques associated with generating an error object (e.g., a Java error object) and storing the error object via an error data structure for analysis, debugging, or the like when an error occurs. Additionally, or alternatively, RTI server 230 may obtain another copy of the update information from archive data structure 912 and may reconvert and retransmit the update information to front end server 220 when an error occurs.

In this way, RTI server 230 may facilitate updates to front end server 220 and/or a web platform associated therewith.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

As indicated above, FIG. 9 is provided merely as an example. Other examples are possible and may differ from what was described with regard to FIG. 9.

Figure 10:
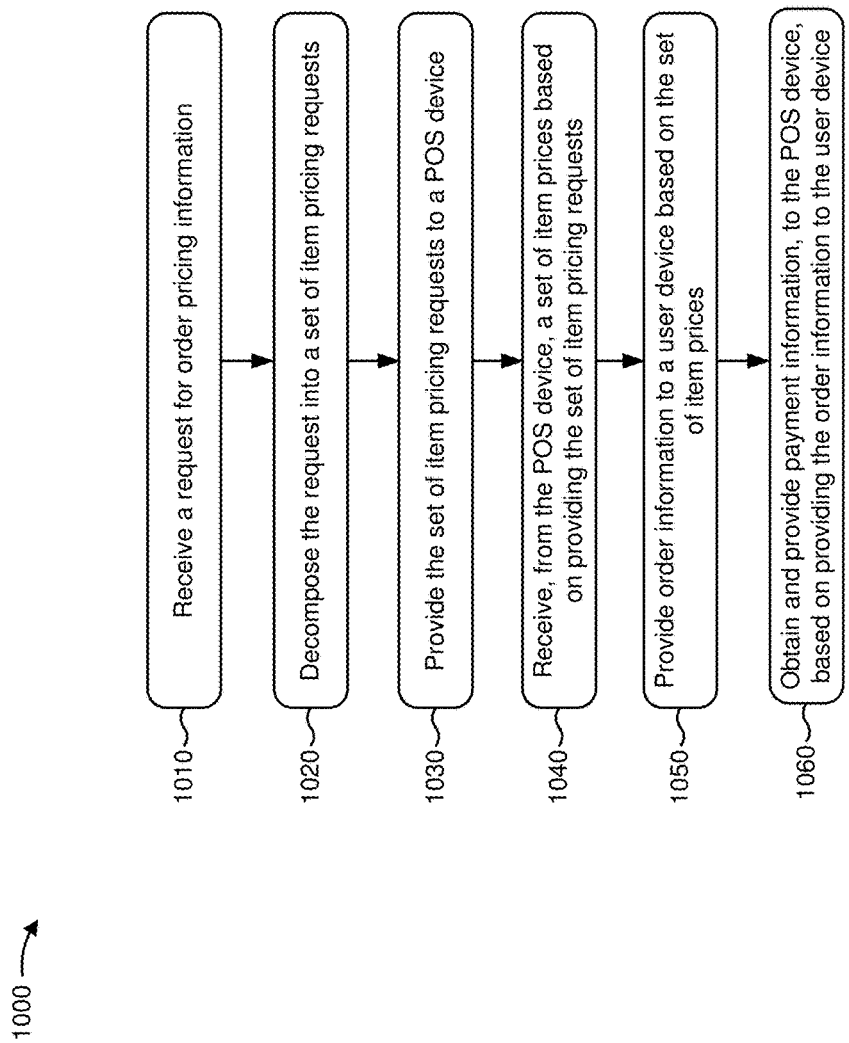
FIG. 10 is a flow chart of an example process for managing payment information for an order.

FIG. 10 is a flow chart of an example process 1000 for managing payment information for an order. In some implementations, one or more process blocks of FIG. 10 may be performed by front end server 220. Additionally, or alternatively, one or more process blocks of FIG. 10 may be performed by another device or a group of devices separate from or including RTI server 230, such as user device 210, RTI server 230, and/or POS device 240.

Figure 11A:
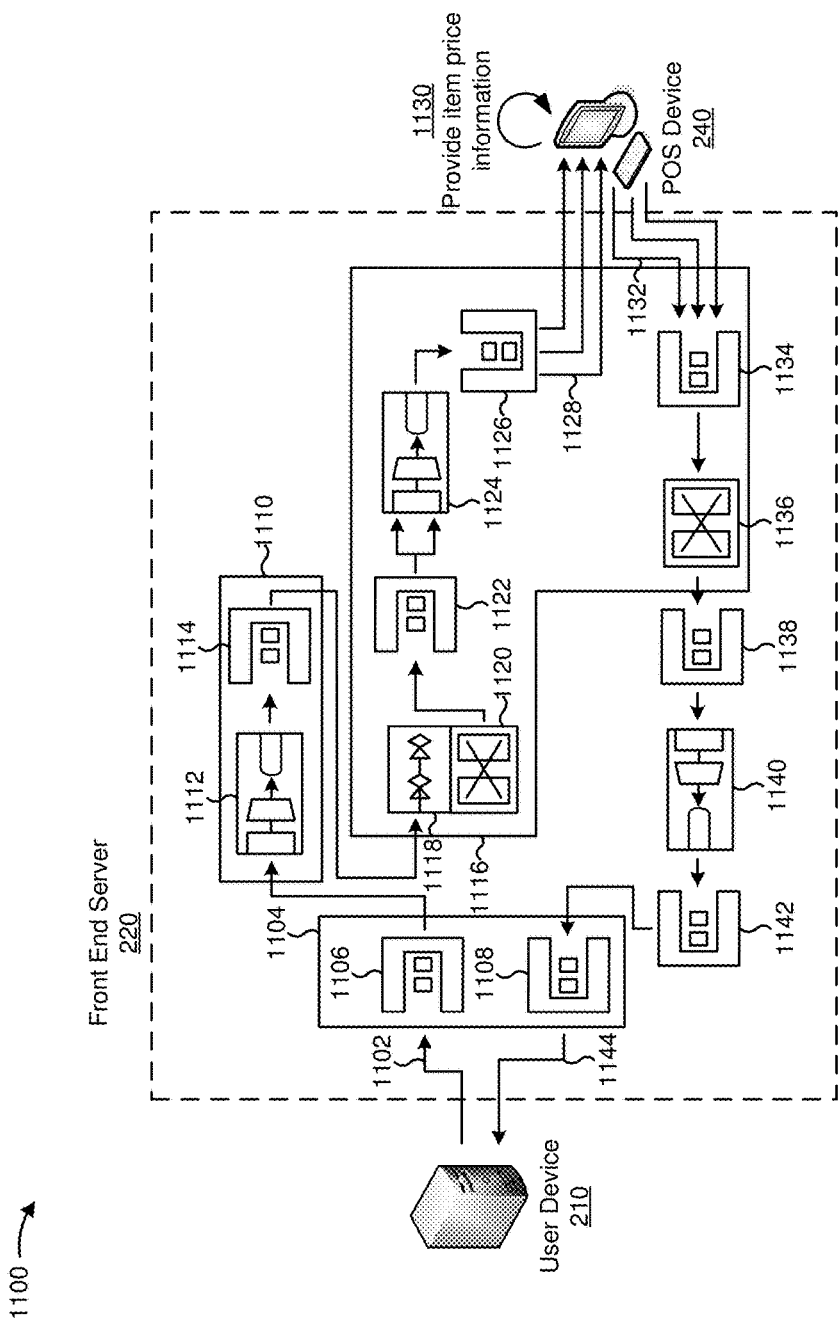
FIGS. 11A and 11B are diagrams of an example implementation relating to the example process shown in FIG. 10.
Figure 11B:
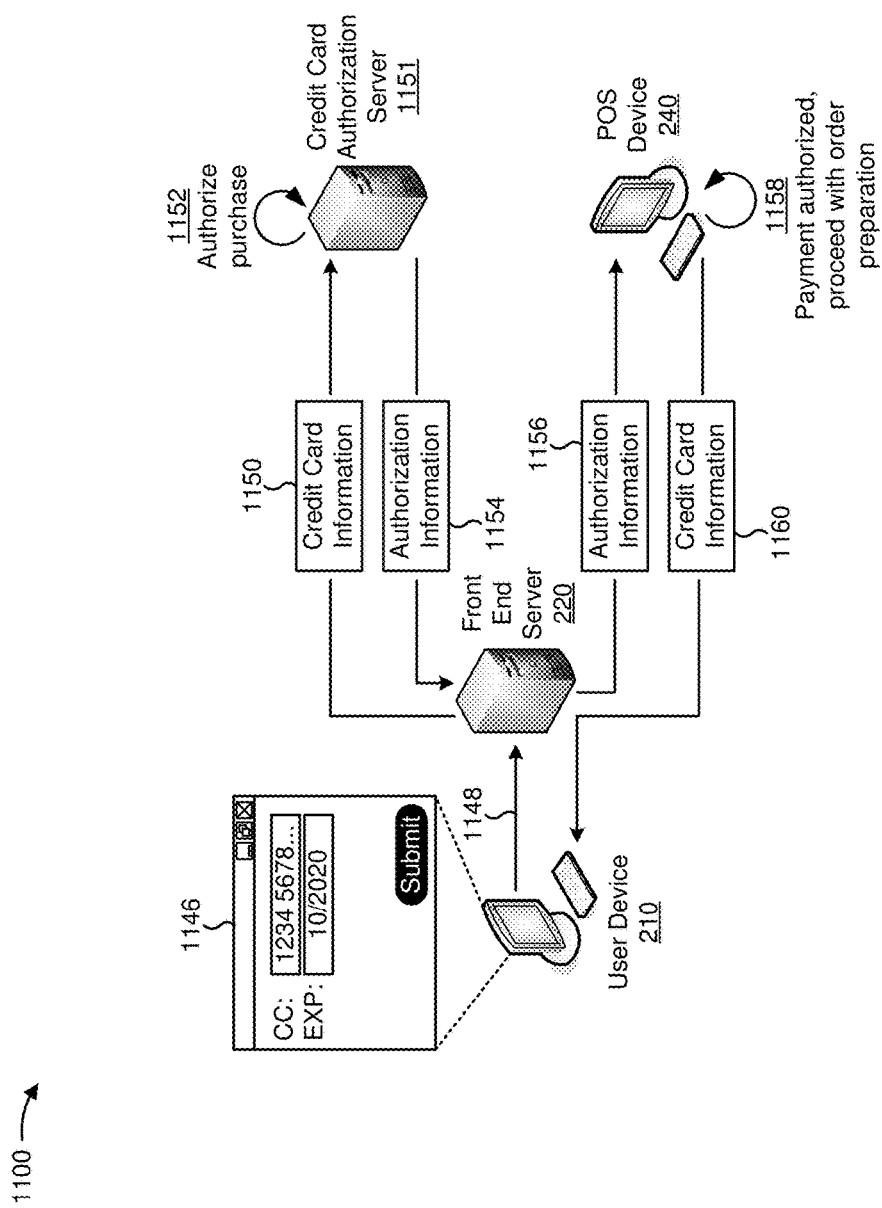

FIGS. 11A and 11B are diagrams of an example implementation 1100 relating to example process 1000 shown in FIG. 10. FIGS. 11A and 11B show an example of managing payment information for an order.

As shown in FIG. 10, process 1000 may include receiving a request for order pricing information (block 1010). For example, front end server 220 may receive the request for order pricing information from user device 210 (e.g., via a web platform associated with front end server 220). In some implementations, front end server 220 may receive the request when user device 210 is intending to place an order. For example, when a user selects a set of items for an order, front end server 220 may receive an instruction to confirm pricing with POS device 240 for each item, of the set of items, before the order can be accepted via the web platform. In this case, the web platform may generate a request for order pricing when a user of user device 210 confirms the order.

For example, as shown in FIG. 11A, and by reference number 1102, user device 210 causes the request to be sent to front end server 220 as confirmation of an order (e.g., which triggers the web platform to generate the request). Assume that the request identifies the set of items. Front end server 220 receives the request via a queue module 1104 (e.g., an ActiveMQ module) that includes an inbound queue 1106 (e.g., a first ActiveMQ queue) and an outbound queue 1108 (e.g., a second ActiveMQ queue). Front end server 220 obtains the request using Spring Integration module 1110. Spring Integration module 1110 includes a JMS inbound gateway adapter module 1112 and a message input channel 1114. Front end server 220 utilizes JMS inbound gateway adapter module 1112 to facilitate receiving the message from inbound queue 1106 and providing the message via message input channel 1114 to parallel execution module 1116.

As further shown in FIG. 10, process 1000 may include decomposing the request into a set of item pricing requests (block 1020). For example, front end server 220 may decompose the request into a set of item pricing requests for POS device 240. Decomposing the request may refer to separating a multi-item order into the set of items, which may be processed in parallel (e.g., processing may include one or more data conversions, queries, or the like). Additionally, or alternatively, the request may be decomposed to perform another type of processing, such as sequential processing on one or more items of the order or the like.

For example, as shown in FIG. 11A, and by reference number 1118, front end server 220 provides the request for order pricing to a service activator 1118 associated with a data conversion module 1120. The data conversion module 1120 is associated with converting the request for order pricing to a format associated with POS device 240. As shown by reference number 1122, front end server 220 utilizes data conversion module 1120 to generate converted information and the converted information (e.g., a set of item pricing requests) is provided to outbound message channel 1122.

As further shown in FIG. 10, process 1000 may include providing the set of item pricing requests to a POS device (block 1030). For example, front end server 220 may transmit the set of item pricing requests to POS device 240. For example, as shown in FIG. 11A, and by reference number 1124, front end server 220 provides the set of item pricing requests to TCP adapter module 1124, which receives each item pricing request of the set of item pricing requests and provides the set of item pricing requests to TCP outbound message channel 1126. Additionally, or alternatively, front end server 220 may utilize one or more modules associated with a non-TCP technique, such as one or more modules associated with an HTTPS technique, a JMS technique, or the like. As shown by reference number 1128, multiple item pricing requests, of the set of item pricing requests, are provided to POS device 240, which, as shown by reference number 1130, provides a set of item prices as a set of response messages 1132.

As further shown in FIG. 10, process 1000 may include receiving, from the POS device, a set of item prices based on providing the set of item pricing requests (block 1040). For example, front end server 220 receives a set of messages including the set of item prices from POS device 240. For example, as shown in FIG. 11A, and by reference number 1134, front end server 220 receives, via TCP inbound channel queue 1134, information identifying the set of item prices from POS device 240.

As further shown in FIG. 10, process 1000 may include providing order information to a user device based on the set of item prices (block 1050). For example, front end server 220 provides order information to user device 210 based on the set of item prices. For example, as shown in FIG. 11A, and by reference number 1136, front end server 220 utilizes data conversion module 1136 to perform a data conversion on the information identifying the set of item prices to generate order information, and provides the order information to outbound channel 1138. Front end server 220 provides the order information to a JMS outbound gateway adapter 1140 and to a JMS outbound channel 1142 associated therewith. Front end server 220 provides the order information from JMS outbound channel 1142 to outbound queue 1108. As shown by reference number 1144, front end server 220 provides the order information from outbound queue 1108 to user device 210. In this way, front end server 220 may facilitate a real-time request for information from POS device 240.

As further shown in FIG. 10, process 1000 may include obtaining and providing payment information, to the POS device, based on providing the order information to the user device (block 1060). For example, front end server 220 may obtain payment information and provide the payment information to POS device 240. In some implementations, front end server 220 may receive first payment information from user device 210. For example, user device 210 may provide credit card information to front end server 220 based on receiving information confirming a price for an order. In this case, front end server 220 may provide the first payment information to a credit card authorization server and may receive second payment information (e.g., authorization information, such as encrypted credit card information, an authorization token, a payment confirmation, or the like), which may be provided to POS device 240.

For example, as shown in FIG. 11B, and by reference number 1146, a user of user device 210 inputs credit card information in a form of a web platform. As shown by reference 1148, user device 210 provides the credit card information to front end server 220. Front end server 220 receives the credit card information and, as shown by reference number 1150, provides the credit card information to credit card authorization server 1151. In some implementations, front end server 220 may obtain information regarding POS device 240. For example, front end server 220 may determine a store identifier associated with POS device 240, and may include the store identifier when providing the credit card information to credit card authorization server 1151. In this way, front end server 220 permits authorization server 1151 to authorize and process payment for a store associated with POS device 240.

As shown by reference number 1152, credit card authorization server 1151 authorizes the payment information. As shown by reference number 1154, front end server 220 receives authorization information from credit card authorization server 1151. As shown by reference number 1156, front end server 220 provides the authorization information to POS device 240. As shown by reference number 1158, POS device 240 receives the authorization information and proceeds with order preparation (e.g., POS device 240 adds the order to a display indicating orders for fulfillment, schedules delivery, or the like). As shown by reference number 1160, POS device 240 provides confirmation that the order is being prepared (e.g., information indicating an expected delivery time or the like) to front end server 220, which routes the confirmation to user device 210 for display. Additionally, or alternatively, front end server 220 may route the confirmation to another user device 210 (e.g., a mobile phone via a text message, a set top-box via a message center, or the like).

In this way, front end server 220 may facilitate placing an order with POS device 240 and a secure transaction for the order.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

As indicated above, FIGS. 11A and 11B are provided merely as an example. Other examples are possible and may differ from what was described with regard to FIGS. 11A and 11B.

In this way, an RTI server 230 and/or a front end server 220 may facilitate an ecommerce platform for food delivery that integrates payment, multiple point of sale device formats, or the like. By integrating these features into a single platform, RTI server 230 and/or front end server 220 may improve user experience, reduce usage of computing resources, or the like relative to a system that separates features into multiple isolated modules.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive information regarding a product order via a web portal,
the product order relating to a take-out or delivery of a food product, and
the product order being associated with a particular order format associated with the web portal;
identify a store location associated with fulfilling the product order,
the store location utilizing a particular type of point of sale (POS) device for managing product orders;
select a store configuration, from a set of store configurations associated with a set of store locations, for the store location associated with fulfilling the product order based on identifying the store location, the store configuration specifying information associated with the particular type of POS device;
determine, based on the information associated with the particular type of POS device, a format compatible with the particular type of POS device;
select, based on the format compatible with the particular type of POS device, a data conversion module, associated with the particular type of POS device, from a plurality of data conversion modules accessible to the device,
each of the plurality of data conversion modules being associated with converting information to an information format associated with a respective type of POS;
perform, using the data conversion module associated with the particular type of POS device, one or more data conversions on data identifying the product order to generate a converted product order;
store the converted product order in a queue dedicated for a POS device of the store location;
receive update information regarding the food product being offered for sale via the web portal;

perform, by reusing the data conversion module associated with the particular type of POS device, one or more data conversions on the update information to generate converted update information; and
provide the converted update information to update the web portal.

2. The device of claim 1, where the one or more processors are further to:
cause the converted product order to be provided from the queue to the POS device.

3. The device of claim 2, where the one or more processors, when causing the converted product order to be provided from the queue to the POS device, are to:
receive, from a POS device agent of the POS device, a query,
the query relating to information stored in the queue; and
provide the converted product order from the queue based on storing the converted product order in the queue and receiving the query.

4. The device of claim 2, where the one or more processors, when causing the converted product order to be provided from the queue to the POS device, are to:
push the converted product order from the queue toward the POS device based on storing the converted product order in the queue.

5. The device of claim 1,
where the one or more processors are further to:
establish a plurality of queues,
where the plurality of queues correspond to a plurality of POS devices,
where the plurality of POS devices include the POS device, and
where the plurality of queues include the queue.

6. The device of claim 1, where the one or more processors are further to:
establish the queue; and
provide the converted product order from the queue to the POS device based on storing the converted product order in the queue.

7. The device of claim 1, where the one or more processors are further to:
determine that the queue is not instantiated for the POS device;
generate the queue based on determining that the queue is not instantiated for the POS device,
the queue being associated with a data center; and
provide the converted product order from the queue to the data center based on storing the converted product order in the queue,
the data center being associated with routing the converted product order to the POS device.

8. The device of claim 1,
where the one or more processors are further to:
establish a plurality of queues,
the plurality of queues including at least two of:
a first queue uniquely corresponding to a particular POS device of a plurality of POS devices,
a second queue corresponding to two or more POS devices of the plurality of POS devices, or
a third queue corresponding to a data center associated with two or more POS devices of the plurality of POS devices,
where the queue is the first queue, and
where the POS device is the particular POS device.

9. A computer-readable medium storing instructions, the instructions comprising:

one or more instructions that, when executed by one or more processors, cause the one or more processors to:
receive a message identifying a product order via a web portal,
the product order being intended for fulfillment by a store location,
the store location being associated with a point of sale (POS) device, and
the store location being one of a plurality of store locations associated with two or more types of POS devices that utilize corresponding two or more different information formats;
determine, for the message, the store location, of the plurality of store locations, for which the message is intended;
determine, for the store location, an information format, of the two or more different information formats, with which the POS device of the store location is compatible;
select, based on the information format compatible with the POS device, a data conversion module, associated with the POS device, from a plurality of data conversion modules accessible to the one or more processors,
each of the plurality of data conversion modules being associated with converting information to a respective information format associated with a respective type of POS;
convert, using the data conversion module associated with the POS device, the message to the information format;
store the converted message in a queue dedicated for the POS device;
receive update information regarding a product being offered for sale via the web portal;
perform, by reusing the data conversion module associated with the POS device, one or more data conversions on the update information to generate converted update information; and
provide the converted update information to a device responsible for updating the web portal.

10. The computer-readable medium of claim 9, where the queue is an ActiveMQ queue.

11. The computer-readable medium of claim 9, where the one or more instructions, when executed by the one or more processors, further cause the one or more processors to:
provide the converted message from the queue toward the store location via at least one of:
a transmission control protocol,
a hypertext transfer protocol,
a hypertext transfer protocol secure, or
a Java message service.

12. The computer-readable medium of claim 9, where the one or more instructions, that cause the one or more processors to determine the store location, cause the one or more processors to:
determine the store location based on information, included in the message, that identifies the store location.

13. The computer-readable medium of claim 9, where the one or more instructions, that cause the one or more processors to determine the information format, cause the one or more processors to:
identify a POS device type being utilized at the store location; and
determine the information format based on the POS device type.

14. The computer-readable medium of claim 9, where the message is received via an application programming interface layer associated with a Hybris data hub.

15. The computer-readable medium of claim 9,
where the one or more instructions, when executed by the one or more processors, cause the one or more processors to:
    convert the message from a first information format associated with a front end server to a second information format associated with a real-time integration (RTI) server,
        the front end server being associated with a web platform via which a user may select the product order; and
where the one or more instructions, that cause the one or more processors to convert the message to the information format, cause the one or more processors to:
    convert the message from the second information format to the information format.

16. A method, comprising:
receiving, by a device, a product order via a web portal,
    the product order being associated with a particular order format associated with the web portal;
identifying, by the device, a store location associated with fulfilling the product order,
    the store location utilizing a particular type of point of sale (POS) device for managing product orders;
selecting, by the device, a store configuration, from a set of store configurations associated with a set of store locations, for the store location associated with fulfilling the product order based on identifying the store location,
    the store configuration specifying information associated with the particular type of POS device;
determining, by the device and based on the information associated with the particular type of POS device, a format compatible with the particular type of POS device;
selecting, by the device, based on the format compatible with the particular type of POS device, a data conversion module, associated with the particular type of POS device, from a plurality of data conversion modules accessible to the device,
    each of the plurality of data conversion modules being associated with converting information to an information format associated with a respective type of POS;
converting, by the device and using the data conversion module associated with the particular type of POS device, the product order into a converted product order;
storing, by the device, the converted product order in a queue dedicated for a POS device of the store location;
receiving, by the device, update information regarding a product being offered for sale via the web portal;
performing, by the device and by reusing the data conversion module associated with the particular type of POS device, one or more data conversions on the update information to generate converted update information; and
providing, by the device, the converted update information to another device responsible for updating the web portal.

17. The method of claim 16, further comprising:
determining that the queue is not established for the POS device after identifying the store location; and
establishing the queue for the POS device based on determining that the queue is not established for the POS device.

18. The method of claim 16, further comprising:
periodically removing one or more queues from a plurality of queues associated with a plurality of store locations,
    the plurality of queues including the queue.

19. The method of claim 16, further comprising:
providing, to the POS device, information identifying a network address of the queue,
    the POS device being associated with utilizing the network address to obtain the converted product order from the queue.

20. The method of claim 16, further comprising:
providing the converted product order from the queue to the POS device.

* * * * *